United States Patent

Ferrer Zaera et al.

(10) Patent No.: US 9,215,410 B2
(45) Date of Patent: Dec. 15, 2015

(54) TWO-WIRE MULTICHANNEL VIDEO DOOR SYSTEM

(71) Applicant: FERMAX DESIGN & DEVELOPMENT, S.L.U., Valencia (ES)

(72) Inventors: Carlos Ferrer Zaera, Valencia (ES); Enrique Sanchis Peris, Valencia (ES); Vicente Gonzalez Millan, Valencia (ES); Julio Sanchez Gimeno, Valencia (ES); Elias Garcia Garcia, Valencia (ES)

(73) Assignee: Fermax Design & Development, S.L.U., Valencia (ES)

( * ) Notice: Subject to any disclaimer, the term of this patent is extended or adjusted under 35 U.S.C. 154(b) by 0 days.

(21) Appl. No.: 14/324,378

(22) Filed: Jul. 7, 2014

(65) Prior Publication Data

US 2015/0009283 A1    Jan. 8, 2015

(30) Foreign Application Priority Data

Jul. 8, 2013  (EP) .................................... 13382282

(51) Int. Cl.
*H04N 7/14* (2006.01)
*H04N 7/18* (2006.01)
*H04L 25/49* (2006.01)
*H04M 11/02* (2006.01)
*H04L 5/14* (2006.01)

(52) U.S. Cl.
CPC .............. *H04N 7/148* (2013.01); *H04L 5/1423* (2013.01); *H04L 25/4902* (2013.01); *H04M 11/025* (2013.01); *H04N 7/186* (2013.01)

(58) Field of Classification Search
CPC . H04L 25/4902; H04L 5/1423; H04M 11/025
USPC ....................................................... 348/14.12
See application file for complete search history.

(56) References Cited

U.S. PATENT DOCUMENTS 5,923,363 A * 7/1999 Elberbaum .................... 348/156
6,711,122 B1 * 3/2004 Langley et al. ............... 370/205

(Continued)

FOREIGN PATENT DOCUMENTS

CN        1883141      12/2006
EP        0 039 385    11/1981

(Continued)

OTHER PUBLICATIONS

European Search Report issued Nov. 22, 2013 in corresponding European Application No. 13 38 2282.

(Continued)

*Primary Examiner* — Creighton Smith
(74) *Attorney, Agent, or Firm* — Wenderoth, Lind & Ponack, L.L.P.

(57) ABSTRACT

Two-wire multichannel video door system that comprises at least two street panels (20) with video camera (18) and home terminals, provided with an intercom, or with a monitor intercom. Characterized in that the street panels comprise the following: a digital BNFSK modulator and a digital BNFSK demodulator for transmitting audio and data to an intercom terminal, provided with a digital BNFSK modulator and a digital BNFSK demodulator; and a digital PPM modulator and a digital PPM demodulator for the transmission of audio and video to a monitor terminal, provided with a digital BNFSK modulator and a digital BNFSK demodulator and a digital PPM modulator and a digital PPM demodulator, to maintain at least two simultaneous bidirectional audio conversations between two terminals with two street panels, and to send video from the street panels to the terminals at the same time, using any type of conventional cabling.

4 Claims, 3 Drawing Sheets

(56) References Cited

U.S. PATENT DOCUMENTS 7,254,140 B1 8/2007 Rokhsaz et al.
2009/0010321 A1* 1/2009 Chalopin et al. ............. 375/239

FOREIGN PATENT DOCUMENTS

| EP | 1 569 454 | 8/2005 |
|----|-----------|--------|
| EP | 1 843 590 | 10/2007 |
| ES | 2 273 578 | 5/2007 |
| ES | 2 315 138 | 3/2009 |
| JP | 2000-183842 | 6/2000 |
| WO | 2004/090833 | 10/2004 |

OTHER PUBLICATIONS

European Office Action issued Jun. 2, 2015 in corresponding European Application No. 13 382 282.

* cited by examiner

| Value | M | Value | M |
|-------|---|-------|----|
| 0000 | 1 | 1000 | 9 |
| 0001 | 2 | 1001 | 10 |
| 0010 | 3 | 1010 | 11 |
| 0011 | 4 | 1011 | 12 |
| 0100 | 5 | 1100 | 13 |
| 0101 | 6 | 1101 | 14 |
| 0110 | 7 | 1110 | 15 |
| 0111 | 8 | 1111 | 16 |

TWO-WIRE MULTICHANNEL VIDEO DOOR SYSTEM

OBJECT OF THE INVENTION

The invention consists of a new video door system with a simplified installation by means of two conducting wires that allow the simultaneous conversation of audio and video of at least two sets of devices of the system without requiring signal distribution infrastructure elements.

BACKGROUND OF THE INVENTION

It is broadly known that there are video door systems in the market that comprise at least one street panel with a video camera that communicates with a plurality of home terminals provided with an intercom and/or image display monitor by means of a non-polarized two-wire communications line to transmit audio, video, and data through the same, such that they are capable of supporting a conversation between two elements of the installation, transmitting two audio channels (upstream audio and downstream audio), a video channel (normally upstream), and a data channel to manage the system through said two wires. Low-cost elements with very few features (audio communication only) must coexist with other elements having many features (audio and video communication), for which cost is not a limitation, in this type of systems.

For example, we have invention patent ES2315138B1, which describes a system of the aforementioned type using distribution elements that allow creating a point-by-point corridor between the street panel and the home monitor. An FM modulation of the different analog signals is used in this system by means of different signal carriers or frequencies for each one of the signals (upstream audio, downstream audio, video, and data). In addition, a FSK modulation is used for data.

Invention patent U.S. Pat. No. 5,923,363 describes a similar FM modulation system; however, the installation is not really a bus installation, given that it carries out the switching by means of exchangers, resulting in a star installation. In addition, it requires batteries at the terminals to provide the energy supply that the cable is not able to provide to the data at the same time.

European patent EP1569454A2 describes a bus system that allows a single conversation channel, given that the video channel is not modulated. The upstream and downstream audio channels are modulated in FM. It also uses two infrastructure elements: a negative load simulator next to the supply source, which must be adjusted depending on the number of terminals present, and another simulator at the last terminal of each branch, which makes the installation more difficult.

European patent EP1843590A1 describes a two-wire bus video door system that requires the two monitors to be locally supplied at the home. Therefore, this system is not a comprehensive two-wire system, given that the supply for the monitor is not provided by the bus.

All the previous systems allow establishing a single simultaneous communication by means of the use of the analog modulation of information. Establishing more than one simultaneous communication between sets of elements of the system is not possible.

On the other hand, there are many multichannel video door systems in the market using a greater number of conductors. In this sense, we have IP video door systems, such as the one provided in patent ES2273578, which uses structured cabling and computer switch-type infrastructure devices. There are other systems that use coaxial cabling (more expensive) to transmit the different channels through different carriers, therefore requiring transmission means with large bandwidths.

In the state of the art of modulation systems, there are systems and patents that use analog modulation (AM, FM, PM) to transmit analog signals, and others that use digital modulation (FSK, PSK, PIM, PPM, TSK). With respect to the latter, the use of Pulse Position Modulations (PPM) allows a broad bandwidth and are usually used in wireless, optical fiber, or laser communications systems. In this sense, we can cite patent documents U.S. Pat. No. 6,711,122 and US2009010321, wherein the difficulty in transmitting the information through a uncharacterized two-wire line does not take place. All these cases use clearly characterized transmission means that do not hinder the transmission of information. Patent document WO2004090833A1 can also be cited, which describes a data transmission system through a two-wire line for a field bus supplying the devices. However, it has the following limitation: transmission rates are very low (unsuitable for the transmission of audio, never mind video), it uses a master-slave system that slows communication down because slaves need to be questioned one by one to see if they require transmitting information, it requires calibrating the slave devices continuously for their synchronization, and lastly, the changes in consumption of the devices are only allowed in certain moments when data transmission is not allowed, given that the information is affected.

Therefore, the current state of the art currently fails to offer a solution that allows transmitting several simultaneous conversations of audio and video through two conducting wires, through which management data and the power supply are also transmitted. In addition, the systems, still limited to a single conversation channel, require additional infrastructure to adapt the environment and facilitate the transmission of information, which depends on the number of installed devices and the topology of the installation. These system also require a specific type of cable and cannot be adapted to different types of cable.

The solution described below solves the limitations exposed above by means of a video door system that allows avoiding bus infrastructure elements, may be adapted to any type of cable and topology, and allows having simultaneous conversations in this environment and at a reasonable cost for the applicable video door system sector, wherein low-cost elements with very few features (audio communication only) must coexist with other elements having many features (audio and video communication), for which cost is not a limitation.

DESCRIPTION OF THE INVENTION

The invention, just like the systems of the state of the art, comprises at least one street panel with a video camera, connectable, by means of a non-polarized two-wire communications line, to a plurality of home terminals, which include an intercom, or a monitor intercom, to transmit audio, video, and data through the communications line.

The invention presents the novelty that the street panel comprises two types of modulators and demodulators in the same band of frequencies:

a digital BNFSK (Binary Narrow Frequency Shift Keying) modulator and a digital BNFSK demodulator to transmit audio and data towards an intercom-type home terminal, in which case the home terminal comprises a digital BNFSK modulator and a digital BNFSK demodulator; and a digital PPM (Pulse Position Modulation) modulator and a digital PPM demodulator to transmit audio and video towards a monitor intercom-type home terminal, in which case the home terminal comprises a digital BNFSK modulator and a digital BNFSK demodulator and a digital PPM modulator and a digital PPM demodulator.

Although the invention works with a single street panel, it exploits better its performance when more than a street panel (or equivalent devices being able to start a conversation: reception or home terminal)

The configuration described above allows having at least two simultaneous bidirectional audio conversations between one home terminal and a street panel, and between another home terminal with another street panel, simultaneously sending the video from the street panels to the respective terminals using any type of conventional cabling and without the need for additional infrastructure elements. Therefore, the invention allows using two or more street panels at the same time, having two or more simultaneous bidirectional audio conversations and unidirectional video at the same time from the street panels to home terminals with which they communicate.

In order to separate the channels and the information, a Time Division Multiplexing (TMD) multiplexer and the corresponding TDM demultiplexer are envisaged for the digital signals received in order to obtain at least two conversation channels with bidirectional audio and unidirectional video in the transmission line.

In the preferred embodiment of the invention, the A/D, D/A converter, TDM multiplexer, TDM demultiplexer, compressor, decompressor, transmitter, receiver, and modulator are implemented in a Digital Signal Controller (DSC) of the street panel and the home terminals.

The invention envisages the incorporation of a power supply circuit connected to the communications line. The street panel and the home terminals comprise a regulator that extracts the supply from the communication line and generates the different voltages necessary to supply the circuits of the street panel and the home terminals.

DESCRIPTION OF THE PREFERRED EMBODIMENT OF THE INVENTION

Next, a description of the invention based on the aforementioned figures will be made below.

The system of the invention comprises at least two street panels 20 with a video camera 18 (only one street panel 20 has been represented), connectable by means of a non-polarized two-wire communications line 21 to a plurality of home terminals (not represented), provided with an element selected between an intercom and a video intercom, to transmit audio, video, and data through the communications line 21.

Figures 1, 2:
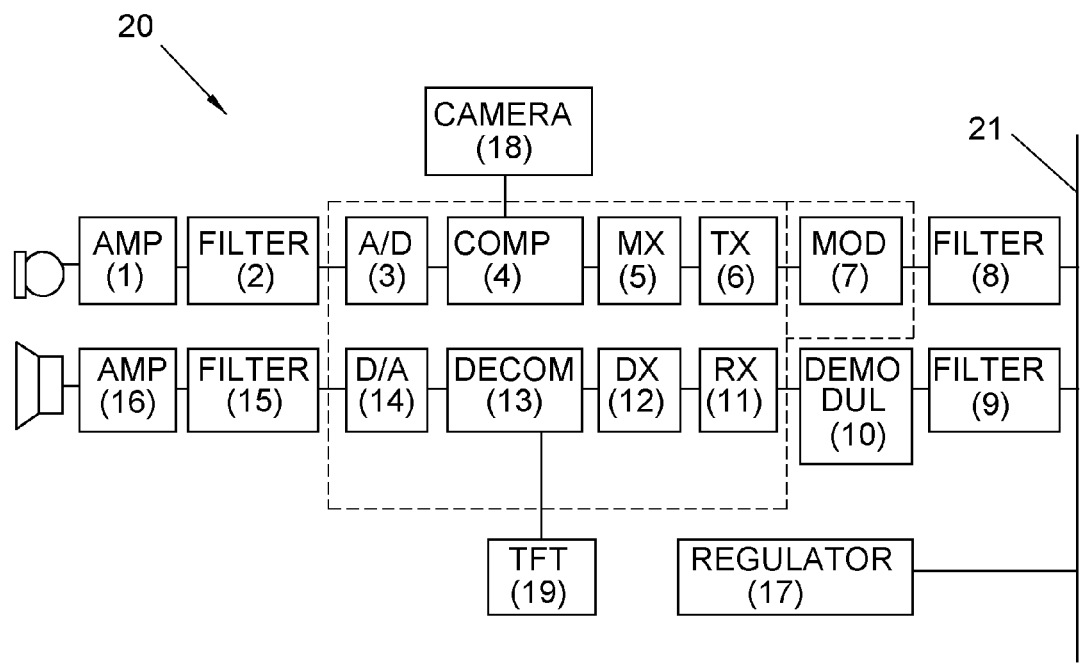
FIG. 1.—Shows a block diagram of an example of an embodiment of the video door system according to the invention.
FIG. 2.—Shows an example of a digital code data value allocation table for the digital modulation of the signal.

Each street panel 20 comprises the devices shown in the scheme of FIG. 1, consisting of the following elements:

1.—AMP. Microphone amplifier. Amplifies the signal captured by the microphone.
2.—Anti-aliasing filter. Eliminates high frequencies.
3.—A/D. Analog—digital converter. Digitalizes the signal of the microphone.
4.—COMP. Compressor. Compresses the signal, which can be the audio signal in the case of audio systems, or the audio and video signal in the case of mixed systems.
5.—Time Division Modulation (TDM) multiplexer. Multiplexes the information to serialize the compressed data to be transmitted at the time slotchannel assigned to the device of one of the at least two conversation channels with bidirectional audio and unidirectional video in the transmission line.
6.—TX. Transmitter that carries out the transmission of the serialized data.
7.—MOD. Modulator. Carries out the modulation of the information depending on its type: BNFSK for audio and data or PPM for audio and video. A PWM generator 25 and a timer 27 are used, although it admits other technological solutions.
8. Output filter. Adapts the square wave signal to a sinusoidal signal and injects and couples the modulated signals at the bus in a differential manner.
9.—Input filter. Extracts the modulated signals from the bus.
10.—DEMODUL. Demodulator. Transforms the modulated signals into low-frequency signals (data). The data conversion is carried out with a PLL circuit 28 and a timer 29, but there are other technological alternatives to implement this functionality.
11.—RX. Receiver. Allocates a coded value (binary in the case of the BNFSK modulation and a trefoil in the case of the PPM modulation) to each tone of the received signal.
12. TDM demultiplexer. Demultiplexes the information of the conversation channel with bidirectional audio and unidirectional video assigned to the device that arrives through the transmission line, regrouping the data received to treat them simultaneously.
13.—DECOM. Decompressor. Decompresses the data received to be treated.
14.—D/A. Digital—analog converter. Converts the data received into analog signals.
15. Output audio filter. Eliminates high-frequency signals.
16.—AMP. Output amplifier. Amplifies the audio signal to attack the speaker with sufficient signal level.
17.—Regulator. Extracts the power supply from the communication bus to supply the circuits of the device, and generates the different voltages as necessary.
18.—Video camera. Captures the image of the scene.
19.—TFT. Shows the image captured by the camera of another device, and other additional information, such as menus, photographs, etc.

The advantage of transmitting the signals in digital format is an increase in the quality thereof, given that they are more immune to external interference, unlike analog signals. In addition, resources are shared for the treatment of said signals, such as transmission and reception elements (including modulation and demodulation), incorporated by each terminal. Another advantage provided by the digital support is being able to share information and require a smaller bandwidth for its transmission, using low modulation carrier frequencies that suffer lower levels of attenuation and reflections in the transmissions through poorly adapted conducting cables such as the two-wire pair. This reduction in frequency also allows avoiding the use of signal distributing devices and its adaptation to any type of installation topology.

The compression of data also allows transmitting more information in less time, due to which it is possible to transmit several bidirectional channels in the same amount of time than transmitting one of them in a analog system.

Therefore, the street panel 20 and the terminals both use the TDM data multiplexer 5, which alternates the different channels, and the TDM demultiplexer 12 for the reception.

Therefore, the invention uses an adaptive modulation for transmission, depending on the devices in the conversation. In the case of a low-cost terminal with reduced features, that is to say, audio only, BNFSK (Binary Narrow Frequency Shift Keying) modulation is used, which is relatively cheap to implement. In the case of terminals participating in the transmission of video signals, PPM (Pulse Position Modulation) modulation is used, which allows greater bandwidth, but at a higher cost. This way, elements with many features can coexist with elements with few features in the same bus, enabling the communication between them and at the cost of the latter.

An important effort has been undertaken to integrate the majority of the devices being used into one device for economic reasons, such that elements 3, 4, 5, 6, 7, 11, 12, 13, and 14 are implemented by means of a single integrated circuit, a DSC (Digital Signal Controller), in the case of an audio device, and by means of a multimedia controller or DSP (Digital Signal Processor) in the audio and video version, which supposes a higher cost due to the functionalities it supports.

The frames transmitted and received between the devices of the system, as indicated above, are multiplexed over time. We have six different frame types:

Data frame 1: command frame between devices. Always BNFSK modulation is used.

Channel 1 upstream audio (or audio+video) frame: frame with the coded and compressed audio (or audio+video) information from the caller to the recipient, corresponding to the first conversation channel. It employs BNFSK modulation if video is not included and PPM if it includes video.

Channel 1 downstream audio frame: frame with the coded and compressed audio information from the terminal receiving the call to the caller, corresponding to the first conversation channel. It employs BNFSK modulation if the rise frame does not include video and PPM if it includes video.

Data frame 2: command frame between devices. Always BNFSK modulation is used.

Channel 2 upstream audio (or audio+video) frame: frame with the coded and compressed audio (or audio+video) information from the caller to the recipient, corresponding to the second conversation channel. It employs BNFSK modulation if video is not included and PPM if it includes video.

Channel 2 downstream audio frame: frame with the coded and compressed audio information from the terminal receiving the call to the caller, corresponding to the second conversation channel. It employs BNFSK modulation if the rise frame does not include video and PPM if it includes video.

The main novelty of the invention consists in using adaptive modulation (BNFSK/PPM) to transmit data, depending on the participating devices and maintaining a sufficiently low binary rate to transmit the data by means of two conducting wires without needing additional bus infrastructure, such that the simultaneous audio and video conversation of at least two pairs of devices of the system is allowed, without requiring signal distribution infrastructure elements.

The BNFSK modulation uses a pair of frequencies to represent each one of the two values of one bit, plus the third frequency for the frame start alert.

The following steps are required to carry out the PPM modulation:

1. Transmission of an initial alert signal 22, based on a sinusoidal signal of a cycle at a fixed frequency.
2. Next, a guard interval 23, without transmitting anything, for a fixed period of time in order to avoid the reflections produced in the transmission line and the deformation of the initial alert signal due to the sudden stop of the transmission in the line.
3. Next, an interval of silence 24, elapsing a period of time proportional to the data to be transmitted. For example, if the information to be transmitted is one nibble (4 bits), representing 16 different values, the line is left on standby for M equal periods of time, M being the value to be transmitted.

The value of M may be the value of the table shown in FIG. 2, although allocating it depending on the frequency or repetitiveness of the actual datum in the total information to be transmitted and depending on type, is preferable with the purpose of transmitting the information in the least time possible and obtaining a greater data transmission speed. The value 1 is allocated to the datum that appears or is repeated the most in the transmission.

Figure 4:
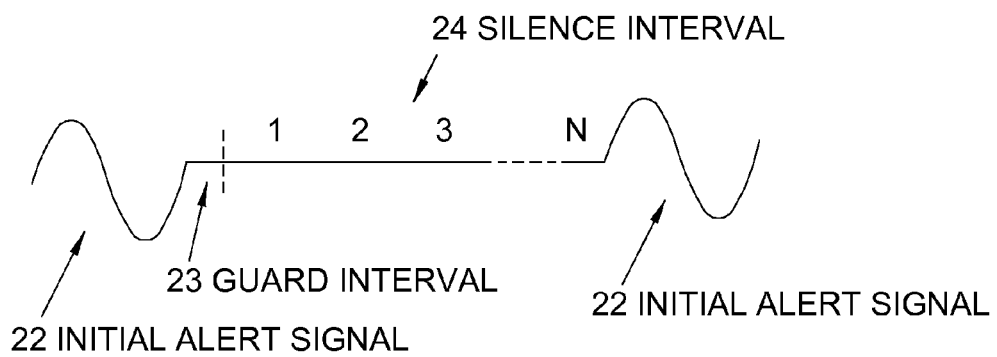
FIG. 4.—Shows a diagram of a PPM-modulated signal at the output of the previous figure, for a generic N value.
Figure 5:
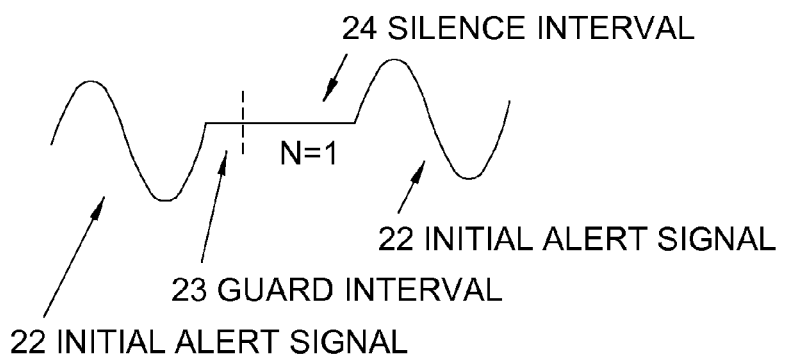
FIG. 5.—Shows a diagram of a PPM-modulated signal at the output of FIG. 4 for a N=1 value.
Figure 6:
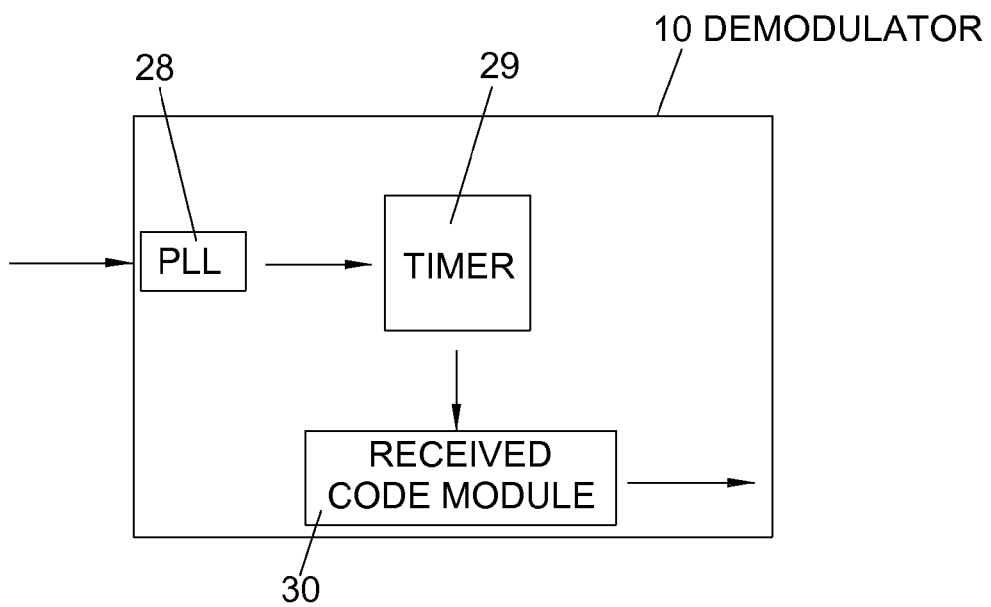
FIG. 6.—Shows a block diagram for an example of an embodiment of the PPM demodulator.
Figure 7:
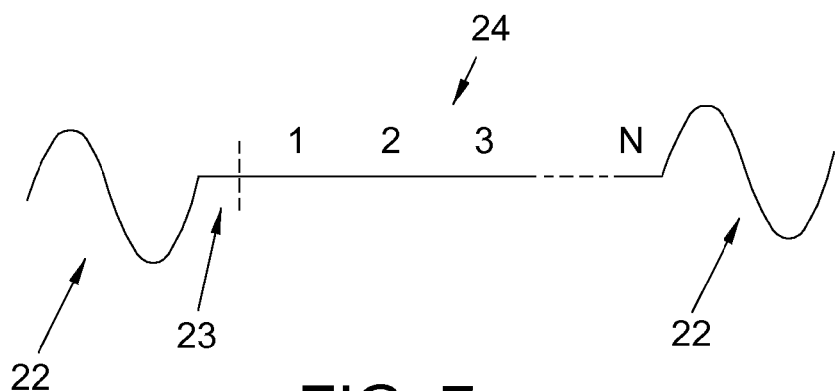
FIG. 7.—Shows a diagram of a signal received at the PPM demodulator of the previous figure, for a generic N value.

Next, the initial alert signal 22 is transmitted once again to indicate that a new value is to be transmitted, that the process is to be repeated, or, if no more data are being transmitted, nothing is transmitted from this signal, which indicates the end of the transmission. FIG. 4 represents the foregoing for an value of M=N and FIG. 5 for a value of M=1.

The lowest speed is obtained for value 16, given that the 16 intervals of silence need to be transmitted. Therefore, this is a method of transmission which speeds depends on the content, unlike in conventional modulation (FSK, ASK, PSK).

Figure 3:
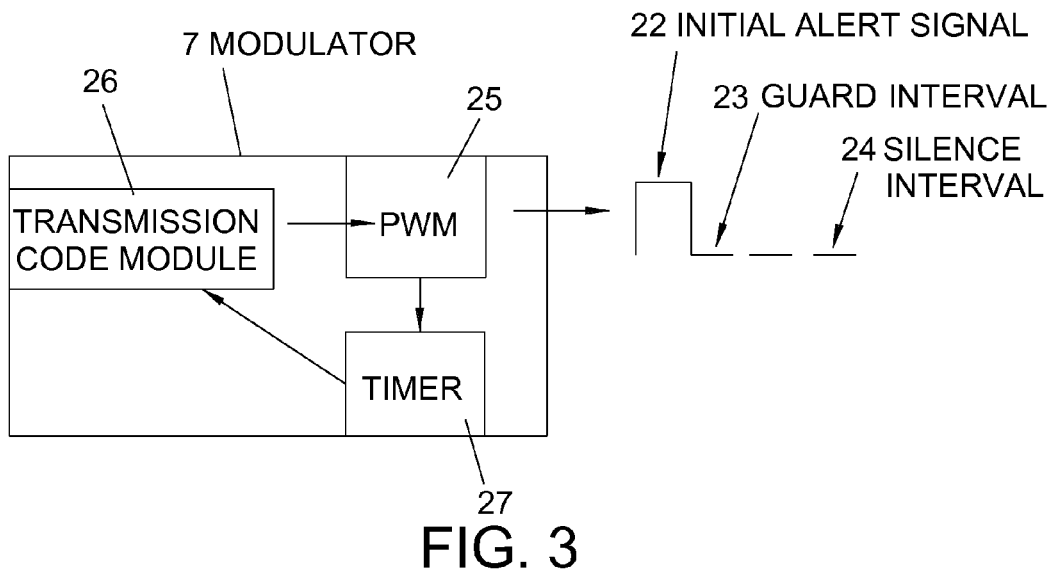
FIG. 3.—Shows a block diagram of an example of an embodiment of the PPM modulator.

To implement the modulator 7, which configuration is shown in FIG. 3, a PWM (Pulse Width Modulation) circuit 25 is preferably used, operating at 50% of the 'duty cycle' for the generation of the start signal (even though it admits other solutions). The PWM circuit 25 is connected to a module 26 that receives the code to be transmitted, from which said code to be transmitted is taken. After being transmitted, it is loaded in a timer 27 with the interval of silence (guard+N intervals), to issue an alert indicating that the next datum can be transmitted after the transmission is completed.

In addition, the modulator 7 comprises storage means of a transcoding table included in the PWM circuit 25, to allocate each datum to each code depending on its frequency of appearance (repetitiveness). When a new code to be transmitted is received by the PWM circuit 25, it activates an initial alert by means of a signal generator, and, during the generation of the start signal 22, the datum to be transmitted is obtained based on the received code by consulting the transcoding table (FIG. 2). The obtained value indicates the number of intervals of silence to be transmitted through the line 21. This value is multiplied by the time of each interval, and is added to the time of the guard signal 23, which final value is deposited in the count register of the timer 27. When the alert signal generator has finished generating the signal, it causes a signal that starts the countdown of the timer 27. When it reaches zero, the timer indicates to the transmitter 6 that it can provide a new code to be transmitted and the process begins once again.

As commented above, after the modulator 7, the signal passes through a filter 8 that converts the square signal into a sinusoidal signal.

The demodulator circuit 10 measures the separation between consecutive initial alert signals 22 and the transmission time thereof and the guard interval 23 are subtracted. The resulting time value provides us with the space equivalent to the transmitted datum which, divided by the value of the period of the intervals of silence, results in the transmitted value, for which we use a transcoding table providing the actual value of the transmitted code based on the transmitted datum. This table allocates the actual codes to the received values depending on the frequency of appearance of the code in the information to be transmitted, a function inverse to the modulator table.

Figure 8:
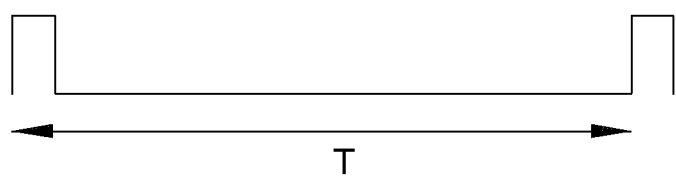
FIG. 8.—Shows a diagram of the output of a Phase Lock Loop (PLL) circuit of the demodulator for a signal received in PPM of FIG. 7, for a generic N value.

As indicated above, a PLL 28 can be used for the measurement of the distance T between start signals, which provides us with a signal at the zero crossing of the start of the start signal, as shown in FIG. 8, but there are other technological solutions to obtain this period T.

The module to detect the alert signals (PLL or other) generates an interruption signal in each detection, which causes the current reading of the timer 29 and the zeroing thereof to begin with the next measurement. From the value of the timer 29 the number of periods of the silence signal is calculated and the actual code received from the transcoding table is extracted into a received code module 30. This value is sent to the Receiver 11, which groups the information in a convenient manner to be processed.

The home terminals have not been represented due to the fact that their configuration can be deduced from the description made for the street panel. If the home terminal is an intercom, they comprise a digital BNFSK modulator and demodulator for a transmission of audio and data directed to a street panel, obviously carrying out the corresponding TDM multiplexing and demultiplexing, according to the invention. The street panel sends the audio and data by BNFSK modulation. In this case video is not sent.

If the home terminal is a monitor intercom, it comprises a digital BNFSK modulator and a digital BNFSK demodulator, and a digital PPM modulator and a digital PPM demodulator. In this case, the digital PPM demodulator carries out the reception of the audio and video and through the PPM modulator the audio transmission. Data are sent and received by BNFSK modulation and BNFSK demodulation.

This scheme obviously simplifies the realization of the transmitter (modulator) and of the receiver (demodulator), which allows implementing them at a very low cost.

Therefore, the configuration described above allows maintaining at least two simultaneous bidirectional audio conversations between one home terminal and one street panel, and between another home terminal with the other street panel, and allows sending the video from each street panel to the respective terminal, using any type of conventional cabling and without the need for additional infrastructure elements. Therefore, the invention allows using two street panels at the same time, maintaining two simultaneous bidirectional audio conversations and unidirectional video at the same from the street panels to the respective home terminals with which they communicate.

The invention claimed is:

1. Two-wire multichannel video door system, that comprises:
    at least one street panel, with a video camera and connectable by means of
    a non-polarized two-wire communications line, with
    a plurality of home terminals, provided with an element selected between an intercom and a monitor intercom,
    to transmit audio, video, and data through the communication line,
    wherein:
    each street panel comprises two types of modulators and demodulators in a same band of frequencies:
    a digital BNFSK (Binary Narrow Frequency Shift Keying) modulator and a digital BNFSK demodulator to transmit audio and data towards an home terminal, consisting of an intercom comprising a digital BNFSK modulator and a digital BNFSK demodulator; and
    a digital PPM (Pulse Position Modulation) modulator and a digital PPM demodulator to transmit audio and video towards a home terminal consisting of a monitor intercom provided with a digital BNFSK modulator and a digital BNFSK demodulator, and a digital PPM modulator and a digital PPM demodulator,
    to maintain at least two simultaneous bidirectional audio conversations between one home terminal and one street panel, and between another home terminal with another street panel, simultaneously sending the video from each of the street panels to the respective home terminal with which it communicates, using any type of conventional cabling.

2. Two-wire multichannel video door system according to claim 1, wherein a separation between channels and between information is carried out by TDM (Time Division Multiplexing) and comprises time-division demultiplexing the modulated digital signals received in order to obtain at least two conversation channels with bidirectional audio and unidirectional video in the transmission line.

3. Two-wire multichannel video door system according to claim 2, wherein system devices constituted by an analog/digital converter (A/D), a digital/analog converter (D/A), a compressor, a decompressor, a TDM (Time Division Multiplexing) multiplexer, a TDM demultiplexer, a transmitter, a receiver, and a modulator are implemented in a Digital Signal Controller (DSC) of the street panel and the home terminals.

4. Two-wire multichannel video door system according to claim 1, further comprising a supply circuit connected to the communications line; wherein the street panel and the home terminals comprise a regulator that extracts supply from the communication line and generates different voltages necessary to supply circuits of the street panel and the home terminals.

* * * * *